March 20, 1956 W. O. REED 2,739,245
WAVELENGTH-RESPONSIVE DEVICE
Filed Nov. 24, 1950
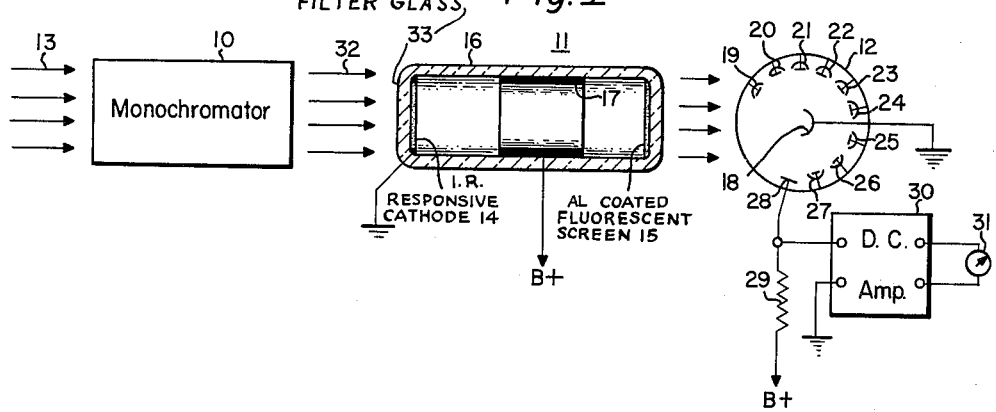
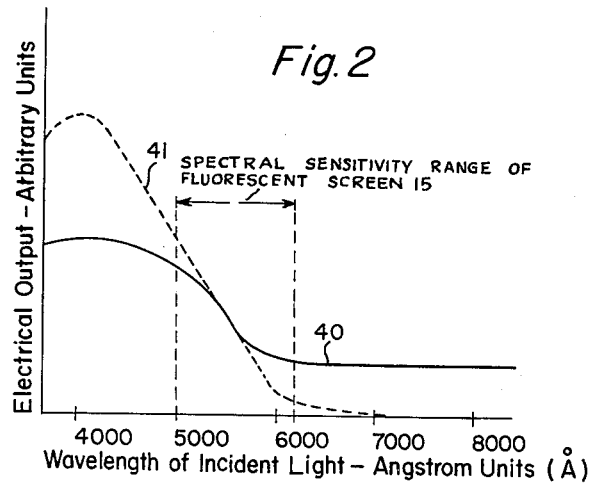
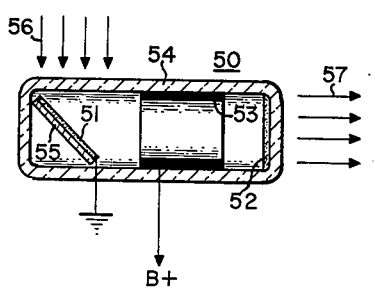
INVENTOR.
WILLIAM O. REED
BY *Francis W. Crotty*
HIS ATTORNEY United States Patent Office 2,739,245
Patented Mar. 20, 1956

2,739,245

WAVELENGTH-RESPONSIVE DEVICE

William O. Reed, Chicago, Ill., assignor, by mesne assignments, to The Rauland Corporation, a corporation of Illinois Application November 24, 1950, Serial No. 197,256

5 Claims. (Cl. 250—217)

This invention relates to wavelength-responsive devices such as spectroradiometers for measuring the spectral energy distribution of polychromatic light.

Spectroradiometers employing photoelectron-multipliers for measuring the spectral energy distribution of incident polychromatic light are well known in the art; however, photoelectron-multipliers which are commercially available at the present time are all characterized by a spectral sensitivity range in the visible and/or ultra-violet portions of the spectrum. There are no commercially available photoelectron-multipliers affording usable spectral sensitivity in the infra-red region, largely due to processing considerations.

It is, therefore, a principal object of the present invention to provide a new and improved wavelength-responsive device having a useful spectral sensitivity range extending well into the infra-red portion of the color spectrum.

It is a further object of the invention to provide a wavelength-responsive device employing a conventional commercially available photoelectron-multiplier, having a spectral sensitivity range greater than that of the photoelectron-multiplier and extending into the infra-red portion of the color spectrum.

In accordance with the invention, a new and improved wavelength-responsive device, comprises a photoelectric wavelength-transducer including a photoemissive cathode, a fluorescent screen, and means for directing photoelectrons originating at the photoemissive cathode to the fluorescent screen. This spectral sensitivity range of the fluorescent screen is different from that of the photoemissive cathode. The photosensitive cathode of a photoelectric cell is exposed to the fluorescent screen, and the photoelectric cell has a spectral sensitivity range at least overlapping that of the fluorescent screen.

The term "spectral sensitivity characteristic" is employed, in accordance with conventional practice in the art, to describe the curve relating the emission from a photosurface or the light output from a fluorescent screen to the wavelength of the light input or light output respectively. For purposes of convenience, the term "spectral sensitivity range" is employed throughout the specification and claims to describe the range of wavelengths within which the photoelectron emission or light output of the photosurface or fluorescent screen is at least twenty per cent of the peak value; outputs of less than twenty per cent of the peak value have been found from experience to be too unstable for practicable utility.

The features of the present invention which are believed to be novel are set forth with particularity in the appended claims. The invention, together with further objects and advantages thereof, may best be understood, however, by reference to the following description taken in connection with the accompanying drawing, in which:

Figure 1 is a diagram, partly schematic and partly in cross-section, of a spectroradiometer constructed in accordance with the present invention;

Figure 2 is a graphical representation useful in understanding the operation of the invention, and Figure 3 is a sectional view of an alternate type of wavelength-transducer which may be used in the apparatus of Figure 1.

The spectroradiometer of Figure 1 comprises a monochromator 10, a photoelectric wavelength-transducer 11, and a photoelectron-multiplier 12 arranged in cascade to measure the spectral energy distribution of incident polychromatic light, schematically represented as rays by the arrows 13. Photoelectric wavelength-transducer 11 comprises a grounded photoemissive cathode 14 and a fluorescent screen 15 supported on opposite end walls of an evacuated glass envelope 16. An accelerating electrode 17, which may conveniently assume the form of a conductive metal ring deposited on the inner wall of envelope 16, is provided between photoemissive cathode 14 and fluorescent screen 15 to direct photoelectrons originating at the cathode to the fluorescent screen. Accelerating electrode 17 is maintained at a suitable constant positive operating potential by connection to a suitable source, conventionally designated B+.

Photoelectron-multiplier 12 comprises a photosensitive cathode 18, a plurality of dynodes 19—27, and a final anode or output electrode 28. Cathode 18 is connected directly to ground, and final anode 28 is connected to B+ through an output load resistor 29. Dynodes 19—27 are maintained at progressively increasing positive operating potentials in the conventional manner; circuit connections for the several dynodes are omitted in order to avoid confusion of the drawing.

Output signals developed across load resistor 29 are impressed on a direct-current (D. C.) amplifier 30, and a suitable indicating device 31, such as a microammeter or the like, is connected in the output circuit of D. C. amplifier 30.

In general, incident polychromatic light, represented by arrows 13, is directed to monochromator 10 which functions in a manner well known in the art to select a predetermined monochromatic component of the incident light. The monochromatic light output from monochromator 10, schematically represented by the arrows 32, is directed to photoemissive cathode 14 of photoelectric wavelength-transducer 11 through the transparent end wall of envelope 16.

In accordance with the invention, photoemissive cathode 14 is of the infra-red sensitive type. For example, cathode 14 may comprise a silver-caesium oxide (Ag—O—Cs) surface; such a photosurface is identified as an S-1 surface in accordance with type designations allocated by the Radio Manufacturers' Association (RMA). The spectral sensitivity range of an S-1 photosurface extends from about 4,500 Angstrom units (A) to about 10,000 Angstrom units.

Further in accordance with the invention, fluorescent screen 15 is constructed of willemite or other screen phosphor exhibiting a peak response in the blue-green region of the color spectrum. The spectral sensitivity range of willemite extends from about 5,000 Angstrom units to about 6,200 Angstrom units.

Thus, when monochromator 10 is adjusted to select the infra-red components of the incident polychromatic light 13, photoelectrons are emitted by cathode 14 and directed to fluorescent screen 15 by accelerating electrode 17. In this manner, fluorescent screen 15 is excited to provide a blue-green light output the intensity of which is dependent on the intensity of the light output 32 from monochromator 10.

Photosensitive cathode 18 of photoelectron-multiplier 12 is exposed to fluorescent screen 15 of photoelectric wavelength-transducer 11. Photocell 12 may be a commercially available photomultiplier type 1P21 having an antimony-caesium (Sb-Cs) cathode with a spectral sensitivity range from about 3,400 to 5,800 Angstrom units and a peak sensitivity at about 4,000 Angstrom units; RMA type designation S-4 has been assigned to photosurfaces of this type. Illumination of cathode 18 by the light output from fluorescent screen 15 causes cathode 18 to emit photoelectrons which are then subjected to several stages of secondary-electron multiplication by dynodes 19—27. A greatly amplified electron current is then collected by output electrode or anode 28, and the voltage drop across load resistor 29 is a measure of the intensity of illumination of cathode 18. The output voltage across resistor 29 is amplified by D. C. amplifier 30, and a direct reading corresponding to the light-output intensity from fluorescent screen 15 is obtained from microammeter 31.

Thus, the apparatus of Figure 1 is useful for measuring the spectral energy distribution of incident light for wavelengths above the spectral sensitivity range of the photoelectron-multiplier 12. In accordance with another feature of the invention, the same apparatus may be employed to measure spectral energy at wavelengths below the spectral sensitivity range of the photoelectric wavelength-transducer 11. To this end, photoemissive cathode 14 and fluorescent screen 15 are made translucent to permit partial transmission through transducer 11 of incident light of wavelengths outside the spectral sensitivity range of photoemissive cathode 14 but within the spectral sensitivity range of photoelectric cell 12. Alternatively, photoemissive cathode 14 and/or fluorescent screen 15 may be reticulated to permit partial light transmission. Thus, when monochromator 10 is adjusted to select a monochromatic component of incident light 13 in the blue-green region of the color spectrum, the light output 32 from monochromator 10 does not cause sufficient photoemission from cathode 14 to provide a reliable indication of the light intensity. However, the incident light 32 is partially transmitted, unaltered in wavelength, through translucent cathode 14 and fluorescent screen 15 to photosensitive cathode 18 of photoelectric cell 12. As a consequence, the light emitted by fluorescent screen 15, too weak of itself to be of practical utility, is augmented by the transmitted light so that the total radiant energy incident on cathode 18 is sufficient to provide a reliable intensity measurement. Again, the intensity of the light output 32 from monochromator 10 may be read directly by means of microammeter 31.

To obtain the desired effective extension of the spectral sensitivity characteristic, photoemissive cathode 14 and fluorescent screen 15 may be translucent, semi-transparent, or constructed as a reticulated opaque structure, since the specular transmission characteristics are unimportant. In a general sense, therefore, it is essential only that the wavelength-transducer 11 be at least partially pervious to incident light of wavelengths outside the spectral sensitivity range of photoemissive cathode 14 but within the spectral sensitivity range of photomultiplier 12.

In Figure 2, curve 40 is a graphical representation of the overall spectral sensitivity characteristic of the spectro-radiometer of Figure 1, and dotted curve 41 represents the spectral sensitivity characteristic of photoelectron-multiplier 12 alone. Comparison of the two curves makes it readily apparent that the spectral sensitivity range of the novel spectroradiometer arrangement is much greater than that of the photomultiplier itself. Specifically, the upper limit of the useful spectral sensitivity range of the photomultiplier is encountered at about 5,800 Angstrom units while useful spectral sensitivity of the overall arrangement is obtained at wavelengths in excess of 8,000 Angstrom units.

In order to render the spectral sensitivity of the overall system more nearly uniform through the entire range, an optical absorption filter may be arranged in cascade with photoemissive cathode 14 of photoelectric wavelength-transducer 11, in order to attenuate the low-wavelength components relative to the infra-red components. In its simplest form, such an optical filter may be provided by constructing the end wall 33 of envelope 16 adjacent cathode 14 of a filter glass having the desired attenuation characteristics; for example, a small amount of cobalt oxide or other blue coloring agent may be included in the glass. Alternatively, a separate optical filter (not shown) may be interposed between monochromator 10 and transducer 11.

While suitable operation of the wavelength-responsive device comprising photoelectric wavelength-transducer 11 and photoelectron-multiplier 12 is obtained in accordance with the invention whenever the spectral sensitivity range of cathode 18 at least overlaps that of fluorescent screen 15, optimum performance is obtained if the spectral sensitivity ranges of photocathode 18 and fluorescent screen 15 are substantially coextensive. Examples of screen phosphors having cathodoluminescence emission bands substantially coextensive with the S-4 response range of conventional photoelectron-multipliers are calcium tungstate activated with tungsten and zinc sulfide activated with silver. When such screen phosphors are employed, however, it has been found necessary to employ special precautions during the processing of the wavelength-transducer to avoid contamination of the screen during cesiation of the photoemissive cathode 14. For this purpose, a metal backing layer (not shown) of aluminum or other suitable material may be deposited over fluorescent screen 15 in a manner well known in the art.

In accordance with another embodiment of the invention, instead of making the photoemissive cathode of the photoelectric wavelength-transducer translucent to permit partial transmission through the transducer of incident light of wavelengths outside the spectral sensitivity range of the photoemissive cathode, such partial transmission may be accomplished by employing a transducer 50 constructed in the manner illustrated in Figure 3. Wavelength-transducer 50 comprises a grounded photoemissive cathode 51, a fluorescent screen 52, and an accelerating electrode 53, connected to B+, intermediate cathode 51 and fluorescent screen 52. Photoemissive cathode 51 is deposited on a support member 55 which in turn is mounted within envelope 54 in a plane at an acute angle (preferably 45 degrees) with that of fluorescent screen 52. Photoemissive cathode 51 and support member 55 constitute an opaque reflecting surface, and fluorescent screen 52 is made translucent as in the embodiment of Figure 1. Incident monochromatic light rays 56 within the spectral sensitivity range of cathode 51 excite the cathode, and the emitted photoelectrons are directed to fluorescent screen 52 by accelerating electrode 53. Light rays 57 from the activated fluorescent screen are then utilized to excite the photosensitive cathode of a photocell as in the apparatus of Figure 1. On the other hand, if the incident light 56 is of wavelength below the spectral sensitivity range of cathode 51, it is reflected from the opaque surface provided by cathode 51 and support member 55; since the angle of reflection is equal to the angle of incidence, and since fluorescent screen 52 is translucent, this reflected light is transmitted, partially attenuated, through the transducer 50 and is used to excite the photocell.

The novel wavelength-responsive device provided by the present invention finds application in the measurement of the spectral energy distribution of the output from the fluorescent screens of cathode-ray tubes, and in other applications where it is necessary or desirable to obtain spectral energy measurements at wavelengths above about 5,800 Angstrom units. The utility of the device is not limited, however, to measuring applications. For example, the system of Figure 1 may be employed as a signal detector in a wavelength-modulated infra-red signalling system merely by omitting monochromator 10 and substituting a suitable load circuit for microammeter 31.

Moreover, while the invention has been illustrated and described in connection with a photoelectron-multiplier, it is also within the scope of the invention to employ a simple photocell followed by a sufficient number of stages of amplification to provide an output voltage or current of the necessary magnitude. The use of a photo-electron-multiplier is preferred, however, for economic and other reasons.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A wavelength-responsive device comprising: a photoelectric wavelength-transducer including a photo-emissive cathode having a predetermined spectral sensitivity range, a fluorescent screen having a predetermined spectral sensitivity range differing from that of said photo-emissive cathode, and means for directing photoelectrons originating at said photoemissive cathode to said fluorescent screen; and a photoelectric cell having a photosensitive cathode exposed to said fluorescent screen and having a spectral sensitivity range at least overlapping that of said fluorescent screen; said wavelength-transducer being at least partially pervious to incident light of wavelengths outside the spectral sensitivity range of said photoemissive cathode but within the spectral sensitivity range of said photoelectric cell, whereby the spectral sensitivity range of said wavelength-responsive device is rendered greater than that of said photoelectric cell.

2. A wavelength-responsive device comprising: a photoelectric wavelength-transducer including a photo-emissive cathode having a predetermined spectral sensitivity range, a fluorescent screen having a predetermined spectral sensitivity range different from that of said photo-emissive cathode, and means for directing photoelectrons originating at said photoemissive cathode to said fluorescent screen; and a photoelectric cell having a photosensitive cathode exposed to said fluorescent screen and having a spectral sensitivity range at least overlapping that of said fluorescent screen; said photoemissive cathode and said fluorescent screen being at least partially light-pervious to permit partial transmission to said photosensitive cathode through said wavelength-transducer of incident light of wavelengths outside the spectral sensitivity range of said photoemissive cathode but within the spectral sensitivity range of said photoelectric cell, whereby the spectral sensitivity range of said wavelength-responsive device is rendered greater than that of said photoelectric cell.

3. A wavelength-responsive device comprising: a photoelectric wavelength-transducer including a photo-emissive cathode having a predetermined spectral sensitivity range, a fluorescent screen having a predetermined spectral sensitivity range different from that of said photo-emissive cathode, and means for directing photoelectrons originating at said photoemissive cathode to said fluorescent screen; and a photoelectric cell having a photosensitive cathode exposed to said fluorescent screen and having a spectral sensitivity range at least overlapping that of said fluorescent screen; said photoemissive cathode being opaque and supported in a plane at an acute angle with the plane of said fluorescent screen, and said fluorescent screen being at least partially light-pervious, to permit partial transmission to said photosensitive cathode through said wavelength-transducer of incident light of wavelengths outside the spectral sensitivity range of said photoemissive cathode but within the spectral sensitivity range of said photoelectric cell, whereby the spectral sensitivity range of said wavelength-responsive device is rendered greater than that of said photoelectric cell.

4. A wavelength-responsive device comprising: a photoelectric wavelength-transducer including a photoemissive cathode having a predetermined spectral sensitivity range, a fluorescent screen having a predetermined spectral sensitivity range different from that of said photo-emissive cathode, and means for directing photoelectrons originating at said photoemissive cathode to said fluorescent screen; a photoelectric coil having a photosensitive cathode exposed to said fluorescent screen and having a spectral sensitivity range at least overlapping that of said fluorescent screen; said wavelength-transducer being at least partially pervious to incident light of wavelengths outside the spectral sensitivity range of said photoemissive cathode but within the spectral sensitivity range of said photoelectric cell; and an optical filter arranged in cascade with said photoemissive cathode for selectively attenuating incident light of wavelengths within the spectral sensitivity range of said photoelectric cell, whereby the spectral sensitivity of said wavelength-responsive device is rendered substantially uniform and extends over a range greater than that of said photoelectric cell.

5. A spectro-radiometer comprising: a monochromator, a light-transducer including an infra-red sensitive photoemissive cathode, a blue-green sensitive fluorescent screen, and means for directing photoelectrons originating at said cathode to said fluorescent screen; and a blue-green sensitive photoelectron-multiplier having a photosensitive cathode exposed to said fluorescent screen; said photoemissive cathode and said fluorescent screen being supported in substantially parallel planes and being light-pervious to permit partial transmission to said photosensitive cathode through said light-transducer of blue-green light, whereby the spectral sensitivity range of said spectro-radiometer extends over substantially the entire spectrum from blue-green to infra-red.

References Cited in the file of this patent

UNITED STATES PATENTS

| | | |
|---|---|---|
| 2,131,185 | Knoll | Sept. 27, 1938 |
| 2,189,623 | Bourland | Feb. 6, 1940 |
| 2,196,691 | Batchelor | Apr. 9, 1940 |
| 2,258,294 | Lubszynski et al. | Oct. 7, 1941 |
| 2,376,311 | Hood | May 15, 1945 |
| 2,417,023 | Sweet | Mar. 4, 1947 |
| 2,525,445 | Canada | Oct. 10, 1950 |